Patented May 23, 1950

2,508,867

UNITED STATES PATENT OFFICE 2,508,867

SEPARATION OF PREFERRED FRACTIONS FROM APPARENTLY HOMOGENEOUS GEL PARTICLES

Louis D. Rampino, Berkeley, Calif., assignor to Shell Development Company, San Francisco, Calif., a corporation of Delaware No Drawing. Application December 22, 1945, Serial No. 637,113

15 Claims. (Cl. 209—8)

This invention relates to improved mineral gels, i. e. substantially amorphous mineral materials having a microporous structure.

In view of the large surface and/or adsorptive properties of materials having a microporous structure, such materials find wide and varied applications in many fields. Particular examples of such applications are as catalysts, catalyst carriers, contact agents, and adsorbents.

For these various purposes, a wide variety of mineral substances is produced in a desired microporous state. Particular examples of such substances are the oxides of silicon, aluminum, zirconium, magnesium, tin, thorium, chromium and molybdenum. Such materials having a microporous structure are generally substantially amorphous and are commonly referred to as gels, as "silica gel," "alumina gel," etc. More specifically, they are sometimes referred to as xerogels and aerogels, depending upon the methods used in their preparation.

The general method for preparing such gels is to first prepare a hydrogel of the desired compound or compounds, and then to remove the water from the hydrogel and finally reduce the dried gel to the desired particle shape and size.

It has long been recognized that in these gels such factors as pore size, pore volume, etc. are equally as important as the chemical composition. It has also been recognized that very minor changes in the various procedures of preparation often exert large effects upon the suitability of the resulting gels for any given specific purpose. Thus, such gels are made with relatively uniform pores of almost any desired size for various particular applications by various carefully controlled procedures of preparation. In spite of this, however, the various gels, even when produced under optimum conditions to produce what appear to be the desired properties, are not entirely satisfactory for many purposes. An example or two will make this more clear. In the catalytic conversion of organic materials, for instance the catalytic cracking of hydrocarbon oils, gel-type catalysts are often employed. In spite of most careful regulation of the properties of the gel catalysts through the procedure of preparation, it is impossible to carry out the desired conversions with the exclusion of side reactions. In catalytic cracking, for example, side reactions cause the rapid contamination of the catalyst with carbonaceous deposits. The production of catalysts offering a maximum conversion with the least amount of such catalyst contamination is one of the major problems of the oil industry.

In the separation of liquid components from solutions by selective adsorption methods, complete efficiency is not obtained in spite of the use of gels having remarkably uniform pore size, pore volume, etc. in the optimum range.

According to the present invention, gels of any desired composition and any desired physical properties which are improved for these various specific applications are provided. The process of the invention is derived, firstly, from the unexpected finding that the apparently and ostensibly uniform and equivalent granules of the gels hitherto used are not in fact alike; secondly, from the finding that granules which are less efficient for any given purpose can be removed leaving a remainder which is more efficient for the given purpose; and thirdly, in the discovery and development of ways for detecting differences in the character of the particles and effecting separation of the particles into two or more fractions.

It is to be emphasized that the invention is not predicated upon any separation of any mixture of obviously heterogeneous particles, i. e. it is not dependent upon the separation of small particles from large particles, nor dense from less dense particles, nor the separation of particles having appreciably different compositions. The gels in question are apparently and ostensibly homogeneous, i. e. all of the particles are apparently the same and there is no reason for assuming or expecting any appreciable difference between separate particles. In the usual case the particles are produced by working up and sizing a single batch of gel. Thus, the particles do not show appreciable difference in such properties as color, shape, chemical analysis, density, pore volume, average pore size, and available surface. It is found nevertheless that individual particles of such gels do vary considerably in effectiveness in actual use and are in fact not completely identical. This, as far as is known, was not hitherto known or suspected. If it was known or suspected, at least there was no known method of identifying the better particles for any given purpose from the poorer ones, and no known means of effecting a separation of the particles into distinct fractions.

According to the process of the present invention in its broader aspect, improved gels are obtained from gels having any desired composition and desired properties of density, average pore size, pore volume, available surface, etc., prepared by the usual and known methods, by subjecting the gel in the form of granules to a developing treatment to develop or produce a recognizable and utilizable difference between the particles, separating the particles into at least two fractions making use of the difference brought about by said development treatment, and finally removing the developing material from the desired fraction or fractions.

While the particles appear to be alike, it is found that they differ in at least one particular, and this is in the time required to come to equilibrium with a sorbable material. As pointed out, no observable or measurable difference in the composition or physical structure of the different granules has been found. The cause of the inhomogeneity is therefore not known. It is apparently due to a minor and, as yet, undetected or unrecognized difference in the physical structure of the particles. It may be due to the presence and/or disposition of a few channels in the particles having diameters in the order of 500Å. Such channels would not be detected by the usual methods for determining pore size and pore distribution by isothermal adsorption methods and would not materially alter the pore volume or density. This observed difference does not in itself offer any means of identifying or separating different granules of the mixture. However, according to the process of the invention, this difference in properties is used as a means of developing a second type of inhomogeneity which may be used as a basis for effecting physical separation of the granules into fractions.

The development of a recognizable or utilizable inhomogeneity between the differently acting particles may be effected, it is found, by subjecting the gel in the form of granules to a uniform development treatment with an agent which, when sorbed to appreciably different extents, causes a recognizable or utilizable change in the physical and/or chemical properties of the developed particles and which may be again removed leaving the particles substantially unchanged. Thus, for example, in most cases the gel granules can be treated with vapors of an organic material under conditions such that restricted carbonization of the material in the particles takes place. It is found that under such conditions the amount of carbonaceous deposits formed corresponds to the inherent inhomogeneity of the particles, probably due to some correlation between the formation of carbonaceous deposits and the adsorption rate of the particles. The particles may then be separated into two or more fractions by means of a sorter using an electric eye or by hand. A particular application of this method is as follows:

A silica gel was prepared from a silica hydrogel in the usual manner. The silica gel was broken up into fragments passing a 6-mesh screen and retained on a 14-mesh screen. As far as could be determined, the particles were all substantially alike. A quantity of the particles was placed in a tube and vapors of isopropyl benzene were passed through the tube at a temperature of about 500° for about one hour. A small amount of decomposition of the isopropyl benzene took place. The granules of gel were converted by this treatment into a heterogeneous mixture of black particles, gray particles and light particles. The granules were then separated into three fractions consisting approximately of 40% of black particles, 40% of light particles, and 20% of intermediate particles, which fractions were returned to their original states by carefully burning out the carbonaceous deposits. The fractions each consisted of glassy granules and appeared alike.

The fractions were submitted to the usual tests for properties. No appreciable differences were found in chemical analysis, available surface, average pore size, or density. However, upon treating the fractions separately with isopropyl benzene, as described, it was found that the fraction which had been black caused a considerable amount of decomposition of the isopropyl benzene and again turned black, whereas the fraction which had been light caused a relatively small decomposition of the isopropyl benzene and was again light-colored. It is evident that the latter fraction is much more superior to the original gel for use as an adsorbent where decomposition of the adsorbed material is to be avoided, whereas the former fraction is much superior to the original gel in applications as an adsorbent where the adsorbed material is removed by burning.

That the fractions separated were in fact not the same in a physical sense is evident from the fact that measurements of the rate of adsorption of liquid isopropyl benzene showed great differences. Thus, the fraction which was dark after development (fraction A) showed a much slower adsorption rate than the fraction which was light-colored after development (fraction B). The actual rates of adsorption are given in the following table:

Table

| Fraction | Pore Volume, cc./g. | Equilibrium Sorption | | | | |
|---|---|---|---|---|---|---|
| | | 80% | 85% | 90% | 95% | 98% |
| | | Time in Minutes | | | | |
| A | 0.276 | 1.2 | 2.4 | 4.4 | 9.0 | 16.7 |
| B | 0.276 | 0.2 | 0.4 | 1.0 | 3.8 | 8.5 |

It will be appreciated that if the above-decribed development treatment had been carried out at appreciably higher temperatures or with a material which was more prone to be decomposed by the gel, all of the particles treated would have become black and, hence, indistinguishable. By suitable adjustments of conditions and agents, this method may be applied to a wide variety of such gels, regardless of the ultimate intended use, and in nearly all cases it will be found that one of the fractions separated is superior to the original gel for that use.

The development of utilizable inhomogeneity between the particles may also be effected in other ways making use of the different rates of adsorption. Thus, the gel may be heavily carbonized by treatment with a decomposable organic material at a relatively high temperature (in which case all of the particles become carbonized) and then subjected to a uniform partial regeneration treatment. After such treatment the carbonized granules may be separated from the decarbonized granules. Also, instead of relying upon the deposition of carbonaceous deposits, the gels may be treated for a limited time with a solution containing a coloring matter which is adsorbed. After such treatment the particles may be separated mechanically or by hand, according to the depth of color or shade. Also, the gel granules may be treated with an adsorbable liquid for a limited time and the particles may be then fractionated, making use of the differences in density of the particles containing the sorbed material, for instance, by elutriation methods. The sorbed material may then be removed by drying, oxidizing, or any other desired method to recover the granules in substantially their original state. Also, the development may be carried out by treating the gel with a suitable material which alters the electrical properties of the granules, for instance, by treating the gel with a solution of ammonia, an amine or other suitable agent for a limited time, and the particles then separated by electrostatic separation methods. Also, the development may be effected by treating the gel for a limited time with a material which alters the magnetic properties of the granules. For instance, the gel may be treated with a solution of an iron salt, then subjected to a reducing treatment to convert the iron salt to metallic iron, or to an oxidizing treatment to convert the iron salt to a magnetic oxide of iron, and finally separated into the desired fractions by magnetic separation methods. The developing agent (iron or magnetic iron oxide) may be removed by leaching with an acid or by volatilization of the iron in the form of iron carbonyl or iron chloride.

In all of the above cases the treatment designed to develop the utilizable inhomogeneity should be carried out for a limited time which is insufficient for the particles or granules having a slow rate of adsorption to become saturated with the sorbed material.

I claim as my invention:

1. Process for the isolation of a fraction of improved microporous mineral gel from a mixture of microporous gel particles in granular form which are essentially homogeneous as to chemical composition, pore volume and average pore size but differ from one another in the time required to come to equilibrium with a sorbable material, comprising the steps of subjecting all particles of said mixture to a developing treatment by bringing them into contact with a sorbable material for substantially equal periods of time less than that required to reach complete equilibrium in all particles, thereby developing a physical inhomogeneity between the particles, separating the particles into at least two fractions on the basis of said developed inhomogeneity, and thereafter removing the sorbed material from at least one of said fractions.

2. The process according to claim 1 wherein the mineral gel is a silica gel.

3. The process according to claim 1 wherein the mineral gel is an alumina gel.

4. The process according to claim 1 wherein the mineral gel is a silica-alumina gel.

5. The process according to claim 1 wherein the developed physical inhomogeneity is one which is visually apparent, and the separation is effected on the basis of the appearance of the particles.

6. The process according to claim 1 wherein the developed physical inhomogeneity is in the density of the particles, and the separation is made on the basis of such difference in density.

7. The process according to claim 1 wherein the developed physical inhomogeneity is in the electrical properties of the particles, and the separation is made on the basis of the electric properties of the particles.

8. Process for the isolation of improved microporous mineral gel from a mixture of microporous mineral gel particles in granular form, said gel consisting essentially of particles which are homogeneous as to chemical composition, pore volume and average pore size, but differ in the time required to come to equilibrium with a sorbable material, subjecting all particles of said mixture to a developing treatment by bringing them into contact with a carbonizable material at elevated temperature for substantially equal periods of time less than that required to effect complete carbonization of all of the particles, thereby depositing a greater amount of carbon on some particles than on others, separating the particles into at least two fractions on the basis of the amount of carbon deposited thereon, and thereafter removing the deposited carbon from at least one of said fractions.

9. Process according to claim 8 wherein the separation of the fractions is made on the basis of a difference in color or shade of the particles.

10. Process according to claim 9 wherein the particles have diameters of the order of one tenth of an inch.

11. Process according to claim 8 wherein the mineral gel is a silica gel.

12. Process according to claim 8 wherein the mineral gel is an alumina gel.

13. Process according to claim 8 wherein the mineral gel is a silica-alumina gel.

14. Process according to claim 8 wherein the carbonizable material is a hydrocarbon and the particles are contacted with the vapors thereof.

15. Process for separating a mixture of microporous mineral gel particles in granular form which are apparently homogeneous as to chemical composition and physical characteristics of pore volume and average pore size, but which differ from one another in the time required to come to equilibrium with a sorbable material, into fractions having different properties, comprising the steps of contacting said mixture with a material which forms a deposit on the particles in amounts dependent upon the rate of sorption of the respective particles under conditions wherein substantially all of the particles are contacted with said material for substantially the same period of time, said period being insufficient to cause the deposition of the maximum amount of deposit on all particles, thereby developing a physical inhomogeneity, separating the particles into at least two fractions on the basis of the relative amounts of said deposit thereon, and thereafter removing the deposit from at least one of said fractions.

LOUIS D. RAMPINO.

REFERENCES CITED

The following references are of record in the file of this patent:

UNITED STATES PATENTS

| Number | Name | Date |
| --- | --- | --- |
| 861,782 | Wait | July 30, 1907 |
| 959,646 | Swart | May 31, 1910 |
| 2,090,418 | Johnson | Aug. 17, 1937 |
| 2,197,862 | Hyman | Apr. 23, 1940 |
| 2,242,553 | Thomas | May 20, 1941 |
| 2,331,353 | Stoewener | Oct. 12, 1943 |
| 2,391,334 | Nicholson | Dec. 18, 1945 |